United States Patent Office 3,078,267
Patented Feb. 19, 1963

3,078,267
METALLIZED AZO DYES CONTAINING A 2-AMINOPHENOLDISULFONAMIDE DIAZO COMPONENT
William H. Armento, Albany, and William E. Wallace, Rensselaer, N.Y., assignors to General Aniline & Film Corporation, New York, N.Y., a corporation of Delaware
No Drawing. Filed Dec. 20, 1960, Ser. No. 77,039
3 Claims. (Cl. 260—147)

This invention relates to the production of novel premetallized azo dyestuffs, and more particularly to such dyestuffs employing as the diazo component the 2-aminophenoldisulfonamide of the formula

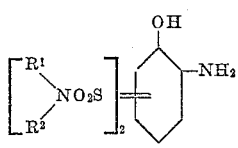

wherein $R^1$ and $R^2$ have the values given below. This compound and its method of production is disclosed and claimed in our copending application Serial No. 704,241, filed on December 23, 1957, now U.S. Patent 2,979,503.

The novel azo dyestuffs of the instant invention may be defined as the complex compounds of chromium or cobalt with an azo dyestuff devoid of free sulfonic and carboxylic acid groups and having the formula

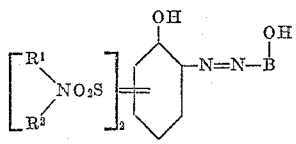

wherein $R^1$ and $R^2$ are selected from the group consisting of H, lower alkyl and hydroxyalkyl of no more than 6 carbon atoms, cyclohexyl, benzyl, phenyl, biphenyl, and when taken together, morpholinyl, piperidinyl and pyridyl; and B represents the radical of a member selected from the group consisting of phenolic, naphtholic, and enolic coupling components, containing the hydroxy group in ortho position to the azo group. The premetallized dyestuffs of the above formula have been found to constitute a group of valuable dyestuffs which are suitable for dyeing animal fibers such as silk, leather, and wool, and nitrogen-containing synthetic organic polymeric fibers such as the super polyamides (nylon), super polyurethanes, polyacrylonitriles (Acrilan, Zefran, Creslan and the like) and similar fibers to produce level dyeings having very good wash and light fastness properties.

In the above formula, $R^1$ and $R^2$ may be the same or different, and may be H, alkyl such as octadecyl, decyl, and preferably lower alkyl such as methyl, ethyl, propyl, isobutyl, and hexyl, cycloalkyl such as cyclohexyl, aralkyl such as benzyl, aryl such as phenyl and biphenyl, and when taken together, morpholinyl, piperidinyl, pyridyl, and the like. It will be understood that $R^1$ and $R^2$ as above defined may contain inert substituents such as hydroxy, lower alkoxy such as methoxy, and the like.

The dyestuffs of the instant invention may be readily prepared in known manner by diazotizing said 2-aminophenoldisulfonamides and coupling the diazotized compound with one of the above defined known coupling components capable of coupling in ortho position relative to the OH group.

Such coupling components are well known in the art, including for example the coupling component "B" as described and claimed in U.S. 2,551,056 and 2,756,223. They may in general be characterized as aromatic (heterocyclic or carbocyclic) compounds containing an active methylene group adjacent to an enolizable keto group, or an aromatic hydroxy or similar group inducing coupling in ortho position relative thereto. Such compounds are typified by the acylacetarylides (e.g. anilides, etc.), the pyrazolones, and aromatic hydroxy compounds capable of coupling. The preferred coupling components includes phenolic, naphtholic and enolic coupling components capable of coupling in ortho position to the hydroxy group.

As acylacetarylides there may be mentioned acetoacetic acid arylides, such as acetoacetanilide, furoyl acetic acid arylides, terephthaloyl-bis-acetic acid arylides, and the like. As pyrazolones, there may be mentioned 1-phenyl-3-methyl-5-pyrazolone, 1 - p-tolyl-3-methyl-5-pyrazolone, 3-methyl-5-pyrazolone, 5-pyrazolone, 1,3-dimethyl-5-pyrazolone, 1-(p-chlorophenyl)-3-methyl-5-pyrazolone, 1-(2',5'-dichlorophenyl)-3-methyl-5-pyrazolone, 1 - (3'-sulfonamidophenyl) - 3 - methyl - 5 - pyrazolone, 1-(p-nitrophenyl)-3-methyl-5-pyrazolone, 1-(o-methoxyphenyl)-3-methyl-5-pyrazolone, 1-methyl-5-pyrazolone, 1-phenyl-5-pyrazolone, 1 - phenyl - 5 - pyrazolone -3 carboxylic acid methyl ester, 1-phenyl-5-pyrazolone-3-carboxylic acid ethyl ester, and other -5 pyrazolones either unsubstituted or substituted in the 1- and/or 3-positions by non-solubilizing radicals. The aromatic (carbocyclic or heterocyclic) hydroxy compounds useful as coupling components herein contain a nuclearly substituted hydroxy group inducing coupling in ortho position thereto and generally include phenols, resorcinols, 1- and 2-naphthols, including 8-acetoamido-2-naphthol and 4,6-dihydroxy-2-naphthalenesulfonamide, hydroxy anthracene, benzonaphthols, hydroxy-benzo-fluorenones, hydroxyazo compounds such as (o-hydroxyaniline→resorcinol), coppered, and aniline→8-amino-2-naphthol and the like, in addition to arylides of β-hydroxy aromatic and heterocyclic carboxylic acids. Illustratively, examples of such arylides (e.g. anilides, etc.) which may be employed in the process of the instant invention are 3-hydroxy-2-naphthoic acid arylides, 3-hydroxy-2-anthroic acid arylides, 3-hydroxy-2-carbazole carboxylic acid arylides, 2-hydroxy-3-dibenzofurane carboxylic acid arylides, 2-hydroxy-11H-benzo-(a)carbazole-3-carboxylic acid arylides, hydroxydibenzothiophene carboxylic acid arylides and the like. These and other such coupling components operative herein are disclosed in Diserenes, "Chemical Technology of Dyeing and Printing," volume 1, pages 213 to 224 (Reinhold Publishing Corp., 1948); Lubs, "Chemistry of Synthetic Dyes and Pigments," pages 182 through 192 (Reinhold Publishing Corp., 1955), and Adams, "Journal of the Society of Dyers and Colorists," volume 67, (1951) beginning at page 223. Those coupling components containing an aromatically bound free amino group enable the attainment of further improved results. Typical amino substituted couplers include aminonaphthols, such as 1-amino-7-naphthol, 1-amino-5-naphthol, and 8-amino-1-napthol-3,6 di(ethylsulfonamide); amino-phenols, such as m-diethylaminophenol, aminoresorcinol, m-aminophenol; aminoazophenols and naphthols, such as 6-hydroxy-4-(o-nitrophenyl-azo)-1-naphthyl-amine; aminophenylpyrazolones, such as methyl m- and p-aminophenylpyrazolone; acylacetarylides substituted in the aryl radical by an amino group, such as acetoacet-m-toluylene-diamine; o-hydroxycarboxylic acid arylides having an amine substituent in the aryl radical, such as 3'-amino-3-hydroxy-2-naphthanilide.

The diazotization of the 2-aminophenoldisulfonamide is carried out in known manner as by treatment with sodium nitrite and dilute hydrochloric acid. Similarly, the coupling reaction is carried out in known manner, usually in an alkaline solution at temperatures which may range from 0 to 50° C.

The azo dyesuffs are then treated with an agent yielding chromium or cobalt in known manner in acid, neutral or alkaline media with or without the use of pressure and/or elevated temperatures. These agents may be applied in the form of their soluble or dispersed oxides, hydroxides or salts, as for example, with inorganic or organic acids such as hydrochloric, sulfuric, hydrofluoric, formic, acetic, tartaric, salicylic acids or the like. The metallizing agent may be used alone or in the presence of an additional substance. Such substance must not cause the metal ion to precipitate under the conditions of use. These substances may or may not form a complex compound with the metallizing agent, as for example, ammonia, pyridine, ethylene diamine, ethanolamine, formamide, formic acid, acetic acid, oxalic acid, aliphatic and aromatic hydroxy-containing compounds such as alcohol, glycerin, aliphatic hydroxy carboxylic acids such as tartaric, lactic and citric acids and the like, sugars, cellulose derivatives, phenols, tannins and lignins and the like, slouble salts of sulfonic acids and carboxylic acids of the aliphatic, aromatic and hydroaromatic series, alkali metal and alkaline earth metal salts, oxides and hydroxides and the like. Dispersing agents, solvents and other assistants may also be employed in the metallizing process.

The metallization may be conducted with one or several metallizing agents simultaneously or successively to yield mixed metalliferous complex azo compounds in accordance with this invention. The metallizing agent may be applied in such manner that the resulting product is one or a mixture of complex compounds of the azo dyestuff containing one atom of metal in complex union with one to two azo dyestuff molecules, depending upon the valence and complex-forming characteristics of the metal, the particular dyestuff employed, the reaction conditions, the desired properties, and the like. The preferrred ratio is one atom of metal to 2 molecules of dyestuffs, as produced in the examples below.

Since the pre-metallized azo dyestuffs of the instant invention are substantially water-insoluble, they are preferably converted to a dispersed form for application to textile fibers from an aqueous bath. The dispersion of these insoluble products may be carried out by mixing the pre-metallized dye with at least an equal amount of a suitable dispersing agent such as a naphthalene formaldehyde sulfonic acid condensation product, and kneading the mixture in a Werner-Pfleiderer mixer for several hours. In addition to dyeing textile fibers from an aqueous dispersion, the instant dyestuffs may also be employed for coloring or pigmenting natural or artificial resins, plastics in bulk, organic solvents, stains, varnishes, lacquers and the like.

The following examples are illustrative of the instant invention and are not to be regarded as limitative. All parts and proportions referred to herein and in the appended claims are by weight unless otherwise indicated.

*Example 1*

Slurry 23.5 g. 2-aminophenolbis (ethylsulfonamid) in 250 cc. water and add 15 cc. hydrochloric acid 20° Bé. Cool to 10° C. with ice. To diazotize, add 5.1 g. sodium nitrite (as solution) as rapidly as taken up as indicated by a spot on starch-iodide paper. When the diazo is ready, pour into a solution of 13.2 g. phenylmethylpyrazolone in 250 cc. water containing 5 g. sodium hydroxide and 25 g. sodium carbonate and which has been cooled to 0 to 5° C. by the addition of ice. When the coupling is complete, the pH is reduced to about 4.5 and salt is added if necessary and the product is collected on a filter. The paste is then slurried in 250 cc. water and the pH is increased to about 8.5 to 9.0 by the addition of sodium carbonate. To this slurry is added a solution of sodium chrome salicylate containing 2.3 g. $Cr_2O_3$ and the whole heated to 100° C. for 2 to 3 hours. The mixture is cooled to 25 to 30° C. and acetic acid is added to pH 4.5 to 5.0 and the solid is filtered off and dried.

The product dyes wool from a neutral to slightly acid bath pleasing shades of red of good fastness properties.

*Example 2*

If in Example 1 the phenylmethylpyrazolone is replaced by 28 g. of 1-amino - 8 - naphtholbis-3,6-(diethylsulfonamide), a dye is obtained which dyes wool from a neutral to slightly acid bath greenish blue shades.

*Example 3*

If in Example 1 the phenylmethylpyrazolone is replaced by 11 g. of 2-napthol, a dye is obtained which dyes wool from a neutral to slightly acid bath reddish blue shades.

*Example 4*

If in Example 1 the phenylmethyl pyrazolone is replaced by 15.2 g. 8-acetylamino-2-naphthol, a dye is obtained which dyes wool from a neutral to slightly acid bath bluish gray shades.

*Example 5*

If in Example 1 the phenylmethylpyrazolone is replaced by 18.5 g. of 2,5-dichlorophenylmethylpyrazolone, a dye is obtained which dyes wool from a neutral to slightly acid bath red shades.

*Example 6*

If in Example 1 the phenylmethylpyrazolone is replaced by 18.3 g. of m-(3-methyl-5-oxo-2-pyrazolin-1-yl) benzenesulfonamide, a dye is obtained which dyes wool in reddish shades from a neutral to slightly acid bath.

*Example 7*

Slurry 23.5 g. 2-aminophenolbis (ethylsulfonamid) in 250 cc. water and add 15 cc. hydrochloric acid 20° Bé. Cool to 10° C. with ice. To diazotize, add 5.1 g. sodium nitrite (as solution) as rapidly as taken up as indicated by a spot on starchiodide paper. When the diazo is ready, pour into a solution of 13.2 g. phenylmethylpyrazolone in 250 cc. water containing 5 g. sodium hydroxide and 25 g. sodium carbonate and which has been cooled to 0 to 5° C. by the addition of ice. When the coupling is complete, the pH is reduced to about 4.5 and salt is added if necessary and the product is collected on a filter. Add paste to 250 cc. water and add 8.8 g. cobalt chloride crystals. Increase pH to 8.5 to 9.0. Heat to 40 to 45° C. for one hour. Reduce pH to 3.5 to 4.0 and filter at 25 to 30° C.

The resulting dyestuff dyes wool brown shades from a neutral to slightly acid bath.

*Example 8*

If in Example 7, the phenylmethylpyrazolone is replaced with 11 g. of 2-naphthol, a dyestuff is obtained which dyes wool a reddish blue shade from a neutral to slightly acid bath.

*Example 9*

If in Example 7, the phenylmethylpyrazolone is replaced with 18.5 g. 2,5-dichlorophenylmethylpyrazolone, a dye-stuff is obtained which dyes wool in a brown shade from a neutral to slightly acid bath.

*Example 10*

If in Example 1 the 2-aminophenolbis (ethylsulfonamid) is replaced by 23.5 g. 2-aminophenolbis (dimethylsulfonamid) a dye is obtained which dyes wool from a neutral to slightly acidic bath in red shades.

*Example 11*

If in Example 1 the 2-aminophenolbis (ethylsulfonamid) is replaced by 20 g. 2-aminophenolbis-(sulfonamid) a dye is obtained which dyes wool from a neutral to slightly acidic bath in reddish shades.

Example 12

If in Example 1 the 2-aminophenolbis (ethylsulfonamid) is replaced by 34 g. 2-aminophenolbis-(sulfonmorpholide) a dye is obtained which dyes wool from a neutral to slightly acidic bath in reddish shades.

Example 13

If in Example 1 the phenylmethylpyrazolone is replaced by 13.4 g. acetoacetanilide a dye is obtained which dyes wool from a neutral to slightly acidic bath in yellowish shades.

This invention has been disclosed with respect to certain preferred embodiments, and various modifications and variations thereof will become obvious to the person skilled in the art. It is to be understood that such modifications and variations are to be included within the spirit and scope of this application.

This application is a continuation-in-part of our application Serial No. 704,312, filed December 23, 1957.

We claim:

1. The complex compound of 1 atom of chromium with 2 molecules of an azo dyestuff devoid of free sulfonic and carboxylic acid groups and having the formula

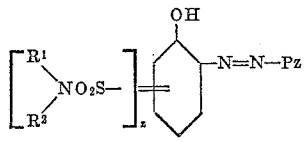

wherein:
(1) $R^1$ is selected from the group consisting of H and lower alkyl of no more than 6 carbon atoms;
(2) $R^2$ is lower alkyl of no more than 6 carbon atoms; and
(3) Pz represents the radical of a 5-pyrazolone coupling component coupled in 4-position.

2. A compound as defined in claim 1 wherein $R^1$ is H and $R^2$ is ethyl.

3. A compound as defined in claim 2 wherein Pz represents the radical of 1-phenyl-3-methyl-5-pyrazolone.

References Cited in the file of this patent
UNITED STATES PATENTS

| | | |
|---|---|---|
| 1,908,571 | Straub et al. | May 9, 1933 |
| 2,551,056 | Schetty | May 1, 1951 |
| 2,711,404 | Schetty | June 21, 1955 |
| 2,723,263 | Kuster et al. | Nov. 8, 1955 |
| 2,723,372 | Kuster et al. | Jan. 24, 1956 |
| 2,804,454 | Beffa | Aug. 27, 1957 |
| 2,817,655 | Schetty et al. | Dec. 24, 1957 |
| 2,979,503 | Armento et al. | Apr. 11, 1961 |

UNITED STATES PATENT OFFICE
CERTIFICATE OF CORRECTION

Patent No. 3,078,267                               February 19, 1963

William H. Armento et al.

It is hereby certified that error appears in the above numbered patent requiring correction and that the said Letters Patent should read as corrected below.

Column 6, line 19, for "2,723,372" read -- 2,732,372 --.

Signed and sealed this 5th day of November 1963.

(SEAL)
Attest:

ERNEST W. SWIDER
Attesting Officer

EDWIN L. REYNOLDS
Acting Commissioner of Patents